Sept. 16, 1930. U. F. L. STEINDORFF ET AL 1,775,787
POWER DRIVEN SHEARS
Filed May 20, 1927
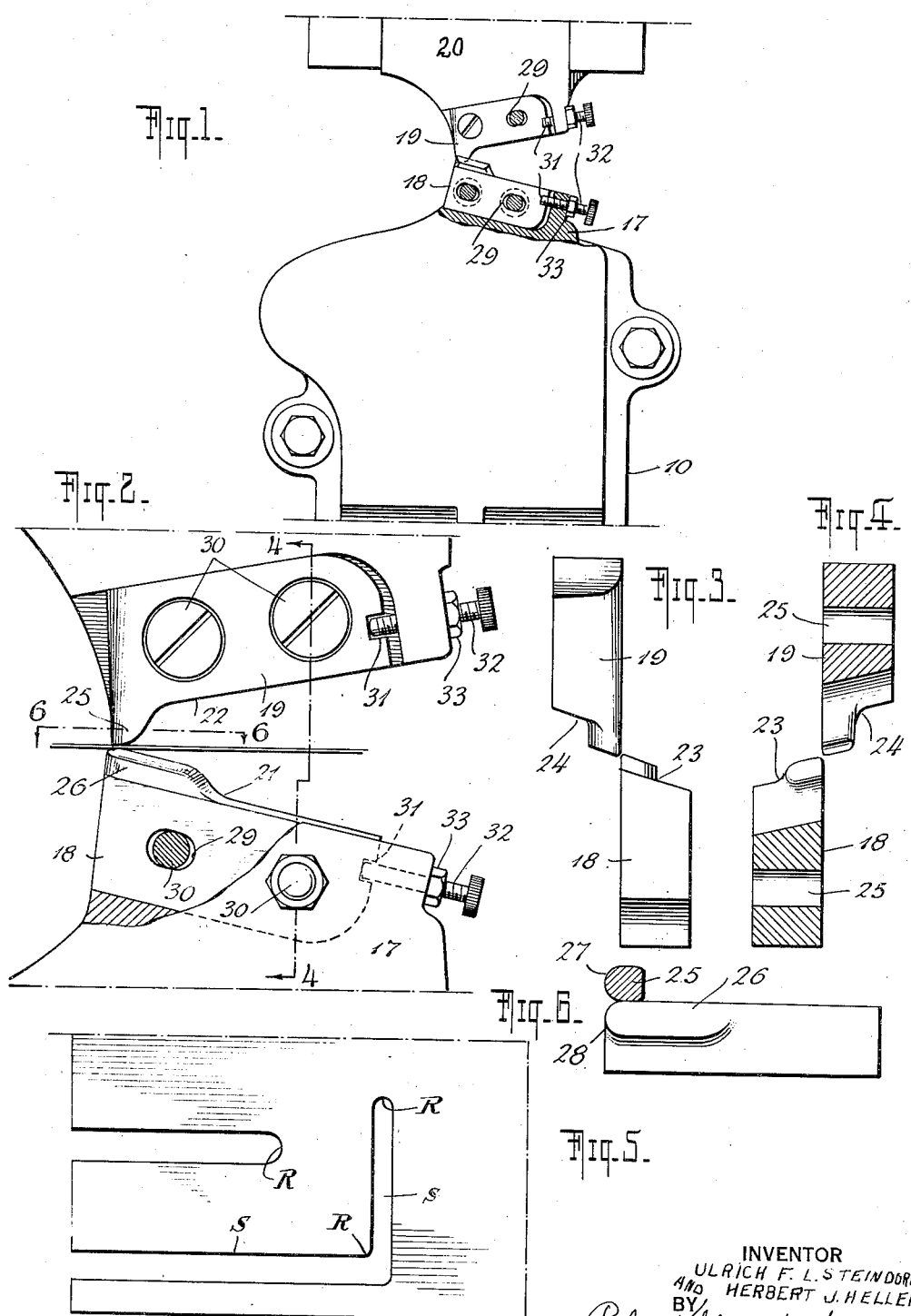
INVENTOR
ULRICH F. L. STEINDORFF
AND HERBERT J. HELLER,
BY
Lotka, Kehlenbeck & Harley
ATTORNEYS Patented Sept. 16, 1930

1,775,787

UNITED STATES PATENT OFFICE

ULRICH F. L. STEINDORFF AND HERBERT J. HELLER, OF NEW YORK, N. Y.

POWER-DRIVEN SHEARS

Application filed May 20, 1927. Serial No. 192,834.

This invention relates to cutting shears and particularly to power driven shears for cutting sheet material such as metal, leather, cardboard, or any similar material, and has for its principal object to provide a new and improved construction by means of which the shears may be used to cut curves of very much smaller radii than possible with such shears as heretofore constructed.

Another object is so to construct the cutting blades of the shears as to obtain greater visibility of the work adjacent to the cutting edges of the blades without detracting from the effectiveness of the cutting action of the blades.

A further object is to provide a new and improved mounting for the cutting blades which includes means to adjust the blades for insuring the proper positioning thereof in order to obtain the most effective cutting action.

Considered in its more specific aspects the invention relates to, and is intended as an improvement on, power driven cutting shears of the type in which a pair of relatively short cutting blades have their cutting edges inclined to each other to provide an open throat into which the work is fed, one of said blades being stationary and the other being reciprocated rapidly by suitable power driven means to perform the cutting strokes.

Other objects of the invention will appear more fully from the following more detailed description and by reference to the accompanying drawings forming a part hereof wherein the invention is illustrated by way of example as applied to a shears of the type above referred to.

In the drawings Fig. 1 is a front elevation partly in section of a shears constructed in accordance with the principles of our invention; Fig. 2 is an enlarged front elevation of the pair of cutting blades and the mounting therefor; Fig. 3 is an end view of the cutting blades; Fig. 4 is a section on the line 3—3 of Fig. 2; Fig. 5 is a plan view of a sheet having portions thereof cut out, the purpose of this view being to illustrate the character of the cuts that can be made with a shears constructed in accordance with the principles of this invention, and Fig. 6 is a section on the line 6—6 of Fig. 2.

As shown in the drawings, the numeral 10 indicates the base of a power driven shears having mounted therein a cutter holder 17, suitably mortised out to receive the cutting blade 18. Any suitable means (not shown) may be provided for rapidly reciprocating either the upper or lower blade with a stroke of small amplitude. The upper blade 19 is mounted in a mortise provided in an upper cutter holder 20 mounted in any suitable support such as a horizontally extending arm spaced above the base 10 and forming therewith an U-shaped frame, or in an upwardly projecting portion of the casting in which the lower cutter holder is mounted.

In order to permit curves of very small radii to be cut, for example, ¼" radius, or thereabouts, and also to provide greater visibility of the cutting line scribed on the work, both of the blades 18 and 19 are cut away on their cutting sides for a considerable part of their length, as indicated by the reference numerals 21, and 22, and also for a portion, approximately half, of their width as indicated by the reference numerals 23, 24, respectively, thus providing on the blades the comparatively small projecting nibs 25, 26, respectively, the opposed outer edges of which nibs form the cutting edges of the blades.

In order to permit the free turning of the work for curves of very small radii, the front vertically extending edges of the nibs 25, 26 are rounded as shown best in Fig. 6 and as indicated by the reference characters 27, 28, while the rear edges of said nibs are also curved vertically as well as horizontally. The length of the cutting edge so provided should be at least as great as the extent of the reciprocation of the blade 14, that is to say, if the stroke is ⅛ of an inch, the minimum length of the cutting edge of the blade should be ⅛ of an inch.

Due to the fact that the cutting blades of shears of the type to which the present invention relates have a stroke of but a very small amplitude and consequently accomplish but a small extent of cut per reciprocation it is of the utmost importance that the positions of the blades relatively to each other be adjusted with great accuracy. For best results they should be so adjusted that the points of the blades are in horizontal alignment, as shown in Fig. 2, when the moving blade is fully retracted and with the front edge of the lower blade slightly in advance of the front edge of the upper blade. In addition, as the blades are operated at a comparatively high speed, it becomes necessary to remove them from time to time for sharpening. The sharpening of the blades, because of the removal of some of the blade material, necessarily changes the relative positions of the cutting edges. In order to enable the blades to be adjusted readily and with great accuracy, the holes 29, through which the bolts 30 pass for securing each blade within its mortise and to its respective blade holder, are elongated, as clearly shown in Fig. 2. The rear end of each blade is also provided with a groove or recess 31 in which the inner reduced end of an adjusting screw 32 is adapted to engage, said screws 32 being screw threaded into the material of the blade holders at the rear end of the mortises. Each adjusting screw is provided at its outer end with a knurled head, and lock nuts 33 are also provided to hold the screws in adjusted position.

If it is desired to cut a curve of small radius, such as shown, for example, at R in Fig. 5, the work may be turned readily without any resistance being offered to such turning by the blades, due to the small extent of blade which at any time is in contact with the cut. The reduction of the width of the blades by the cutting away thereof indicated at 23, 24 and the curvature of both the back and front edges thereof, are important, because the use of these expedients insure that the edges of the blades will not prevent the turning of the work when a narrow slot, such as indicated at S in Fig. 5, is to be cut.

In adjusting the blades, the bolts 30 are loosened and the adjusting screws 32 turned to bring the points of the blades to the proper relative positions, and as both blades are adjustable, the adjustment can be made with both or either blade as desired. The making of both blades adjustable and the angle at which the blades are located enable a sufficient amount of adjustment to be secured, even though the extent of longitudinal adjusting movement of the blades is relatively small.

While we have shown the upper blade as having a shorter cutting edge than the lower blade, it will be understood that both blades may be made identical. For ordinary work, two blades substantially of the same construction as the lower blade 18 will be employed. When, however, curves of exceptionally small radius are to be cut, the shorter upper blade 19 will be used, with the lower blade 18 as shown.

The cutting away of the blades as indicated at 21, 22, permits greater visibility of the cutting line to be obtained especially when cutting along curved lines, as all of the surface of the work sheet, except for a practically infinitesimal amount immediately adjacent to the point where the cutting is being done is clearly visible.

Although each of the blades has its inner or front edge curved or rounded as indicated by the reference character 27 the backing off of the blade on the opposed faces thereof to provide the sharp cutting edges results in the provision of a sharp point at the inner or forward point of each cutting blade which facilitates the penetration of the blades into the material being cut.

While we have referred to the blades as upper and lower blades and to the cutting edges of the blades as lower and upper respectively, it will be understood that the terms lower and upper are not used in a limiting sense but are used merely in a relative sense for the purpose of convenience of description. Obviously, the principles of the invention are equally applicable to a shears in which the work might be fed to the shears in a vertical or any other plane although the shears would ordinarily be mounted or operated in such a position that the work sheet would be held in a horizontal plane.

We claim:

1. A cutting blade for shears having one of its longer edges cut away to leave a small projecting terminal nib, the tip edge of which forms the sole cutting edge of the blade.

2. A cutting blade for shears of the type wherein the blade is rapidly reciprocated in a stroke of small amplitude, said blade having one of its longer edges cut away to leave a small projecting terminal nib, the tip edge of which forms the cutting edge of the blade, the length of said cutting edge being approximately equal to the amplitude of the blade's reciprocation.

3. A cutting blade for shears having its longer side cut away both transversely and longitudinally to leave a small projecting terminal nib the tip edge of which forms the sole cutting edge of said blade.

4. The combination with a shears, of a pair of co-operating cutting blades, the opposed edges of which are cut away for the greater portion of their length, thus forming on each blade a small projecting terminal nib, the opposed tip edges of said nibs forming the active cutting edges of said blades, and leaving a clearance space or opening adjacent to said active cutting edges which allows greater visibility of the work.

5. The combination with a shears of the type wherein means are provided for producing a short stroke rapid reciprocation of the cutting blades, of a pair of cutting blades, one of said blades having a cutting edge of approximately the same length as the amplitude of the stroke of the moving blade and the other of said blades having a longer cutting edge.

6. The combination with a shears of the type wherein means are provided for producing a short stroke rapid reciprocation of the cutting blades, of a pair of cutting blades each having a clearance space cut along the cutting edge side thereof, thereby leaving a small projection upon each blade, the edges of which projections form the active cutting edges of said blades, said clearance space permitting the turning of the work for the cutting of curves of small radii and also allowing greater visibility of the work immediately adjacent to the part being cut.

7. In a shears, a pair of cutting blades having their cutting edges inclined to provide an open throat in which the work to be cut is introduced, and a pair of supports for said blades, each of said supports being provided with an abutment against which its respective blade is seated, said abutments extending substantially parallel to the cutting edges of their respective blades, and means to adjust said blades longitudinally along their respective abutments thereby to vary the relative positions of said blades with respect to their rear edges and to the extent of crossing of their cutting edges in performing a cutting stroke.

8. A cutting blade for shears having one of its longer edges cut away to leave a small projecting nib, the edge of which forms the cutting edge of the blade, and the vertically extending front edges of said nibs being rounded to permit the turning of the work being cut for cutting curves of small radii.

9. A cutting blade for shears having one of its longer edges cut away to leave a small projecting nib, the edge of which forms the cutting edge of the blade and the front and rear edges of said nibs being rounded to permit the turning of the work being cut for cutting curves of the small radii.

10. A shears comprising a pair of cutting blades, and means for imparting a rapid reciprocation thereto, one of said blades having the rear end of its effective cutting edge located slightly in advance of the co-operating rear end of the cutting edge of the other of said blades.

11. A shears comprising a pair of cutting blades having their cutting edges inclined at an oblique angle to provide an open throat into which the material is adapted to be fed, each of said blades having a curved vertical face at its inner end which face terminates at the cutting edge in a sharp point to facilitate penetration of the blades into the material to be cut.

In testimony whereof we have hereunto set our hands.

ULRICH F. L. STEINDORFF.
HERBERT J. HELLER.